United States Patent
Yim et al.

(10) Patent No.: US 9,692,963 B2
(45) Date of Patent: Jun. 27, 2017

(54) METHOD AND ELECTRONIC APPARATUS FOR SHARING PHOTOGRAPHING SETTING VALUES, AND SHARING SYSTEM

(71) Applicant: SAMSUNG ELECTRONICS CO., LTD., Suwon-si, Gyeonggi-do (KR)

(72) Inventors: Hyun-ock Yim, Seoul (KR); Jin-pyo Gwak, Seoul (KR); Su-kyung Kim, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 12 days.

(21) Appl. No.: 14/551,399

(22) Filed: Nov. 24, 2014

(65) Prior Publication Data

US 2015/0189171 A1    Jul. 2, 2015

(30) Foreign Application Priority Data

Dec. 30, 2013  (KR) .................. 10-2013-0167625

(51) Int. Cl.
*H04N 5/232*        (2006.01)

(52) U.S. Cl.
CPC ..... *H04N 5/23225* (2013.01); *H04N 5/23222* (2013.01); *H04N 5/23293* (2013.01); *H04N 5/23206* (2013.01)

(58) Field of Classification Search
None
See application file for complete search history.

(56) References Cited

U.S. PATENT DOCUMENTS

| | | | |
|---|---|---|---|
| 6,311,187 B1* | 10/2001 | Jeyaraman | G06F 17/30575 707/770 |
| 7,233,356 B2 | 6/2007 | Nagao | |
| 7,239,350 B2* | 7/2007 | Ban | H04N 5/23222 348/231.3 |
| 7,336,319 B2 | 2/2008 | Seki | |
| 7,612,806 B2 | 11/2009 | Kazami et al. | |
| 7,813,872 B2 | 10/2010 | Ujino | |
| 2003/0140050 A1* | 7/2003 | Li | G06F 17/30578 |
| 2004/0165085 A1* | 8/2004 | Shibutani | H04N 5/232 348/231.3 |
| 2005/0289117 A1* | 12/2005 | Hiraishi | G06F 17/3089 |

(Continued)

FOREIGN PATENT DOCUMENTS

| | | |
|---|---|---|
| JP | 2003-224750 A | 8/2003 |
| JP | 2003-244609 A | 8/2003 |

(Continued)

OTHER PUBLICATIONS

PCT Search Report and Written Opinion issued for PCT/KR2014/011404 (Feb. 6, 2015).

*Primary Examiner* — Roberto Velez
*Assistant Examiner* — Quan Pham
(74) *Attorney, Agent, or Firm* — Drinker Biddle & Reath LLP

(57) ABSTRACT

A method performed in an electronic apparatus that shares photographing setting values is provided. An image list, including a plurality of images including the photographing setting values, is received from an external device connected to the electronic apparatus via a network. The image list is displayed. An image of a subject is captured based on photographing setting values included in an image selected from the image list.

19 Claims, 14 Drawing Sheets

(56) References Cited

U.S. PATENT DOCUMENTS

| | | | |
|---|---|---|---|
| 2008/0154931 A1* | 6/2008 | Jacobs | H04L 67/22 |
| 2009/0096877 A1 | 4/2009 | Kunishige | |
| 2011/0069179 A1 | 3/2011 | Bathiche et al. | |
| 2012/0083258 A1* | 4/2012 | Rabii | H04W 52/0261 455/418 |
| 2012/0154608 A1* | 6/2012 | Ko | G11B 27/034 348/207.11 |
| 2013/0027569 A1 | 1/2013 | Parulski | |
| 2013/0050507 A1* | 2/2013 | Syed | H04N 1/00137 348/207.1 |
| 2013/0212094 A1* | 8/2013 | Naguib | G01C 21/206 707/730 |
| 2013/0329111 A1 | 12/2013 | Desai et al. | |
| 2013/0332856 A1* | 12/2013 | Sanders | G06F 3/0481 715/753 |
| 2014/0089401 A1* | 3/2014 | Filev | G06F 17/30268 709/204 |
| 2015/0085145 A1* | 3/2015 | Sinha | H04N 5/23206 348/207.1 |

FOREIGN PATENT DOCUMENTS

| | | |
|---|---|---|
| JP | 2004-199514 A | 7/2004 |
| JP | 2004-312240 A | 11/2004 |
| JP | 2006-140857 A | 6/2006 |
| JP | 2006-178856 A | 7/2006 |
| JP | 2006-186541 A | 7/2006 |
| JP | 2007-067870 A | 3/2007 |
| JP | 2007-067874 A | 3/2007 |
| JP | 2007-189470 A | 7/2007 |
| JP | 2007-213231 A | 8/2007 |
| JP | 2008-054304 A | 3/2008 |
| JP | 2008-228039 A | 9/2008 |
| JP | 2009-100220 A | 5/2009 |
| KR | 10-1149090 B1 | 5/2012 |

* cited by examiner

FIG. 8

| Image ID | File name |
|---|---|
| 1 | MANUFACTURING COMPANY 1 |
| 2 | MANUFACTURING COMPANY 2 |
| 3 | MANUFACTURING COMPANY 3 |
| 4 | MANUFACTURING COMPANY 4 |
| 5 | MANUFACTURING COMPANY 5 |
| 6 | MANUFACTURING COMPANY 6 |
| 7 | MANUFACTURING COMPANY 7 |
| 8 | MANUFACTURING COMPANY 8 |
| 9 | MANUFACTURING COMPANY 9 |
| 10 | MANUFACTURING COMPANY 10 |
| 11 | MANUFACTURING COMPANY 11 |
| 12 | MANUFACTURING COMPANY 12 |
| 13 | MANUFACTURING COMPANY 13 |
| 14 | MANUFACTURING COMPANY 14 |
| 15 | MANUFACTURING COMPANY 15 |
| 16 | MANUFACTURING COMPANY 16 |
| 17 | MANUFACTURING COMPANY 17 |
| 18 | MANUFACTURING COMPANY 18 |
| 19 | MANUFACTURING COMPANY 19 |
| 20 | MANUFACTURING COMPANY 20 |
| 21 | MANUFACTURING COMPANY 21 |
| 22 | MANUFACTURING COMPANY 22 |
| 23 | MANUFACTURING COMPANY 23 |
| ... | MANUFACTURING COMPANY 24 |
| 100 | MANUFACTURING COMPANY 25 |
| 101 | PROFESSIONAL USER (PHOTOGRAPHER) 1 |
| 102 | PROFESSIONAL USER (PHOTOGRAPHER) 2 |
| 103 | PROFESSIONAL USER (PHOTOGRAPHER) 3 |
| 104 | PROFESSIONAL USER (PHOTOGRAPHER) 4 |
| ... | ... |
| 1000 | ... |
| 1001 | USER 1 |
| 1002 | USER 2 |
| 1003 | USER 3 |
| 1004 | USER 4 |
| 1005 | USER 5 |
| ... | USER 6 |

MANUFACTURING COMPANY LEVEL: Image IDs 1–100

PROFESSIONAL USER LEVEL: Image IDs 101–1000

GENERAL USER LEVEL: Image IDs 1001–...

METHOD AND ELECTRONIC APPARATUS FOR SHARING PHOTOGRAPHING SETTING VALUES, AND SHARING SYSTEM

CROSS-REFERENCE TO RELATED PATENT APPLICATION

This application claims the priority benefit of Korean Patent Application No. 10-2013-0167625, filed on Dec. 30, 2013, in the Korean Intellectual Property Office, the disclosure of which is incorporated by reference herein in its entirety.

BACKGROUND

1. Field

One or more embodiments relate to a method and electronic apparatus for sharing photographing setting values, and a sharing system.

2. Related Art

In current digital cameras, when current setting values are satisfactory during photographing, it is possible to store the current setting values. Even when a camera is turned off and then turned on, the camera may easily recall stored satisfactory setting values and thus may be easily set up with the satisfactory setting values.

Different camera users like different photographing setting values and want to easily store and recall their own unique setting values. Moreover, beginners, who do not know photographing elements well, want to be guided regarding photographing setting values by a photographing expert. To meet these demands, Bluetooth transmission/sharing technology achieved within a short distance, a technique of sharing photographing setting values via a storage medium such as a memory card, and techniques of receiving photographing setting values in the form of an image having an exchangeable image file format (EXIF) or the like from a server are under development.

SUMMARY

One or more embodiments include a method and electronic apparatus for sharing photographing setting values, and a sharing system.

Additional features will be set forth in part in the description which follows and, in part, will be apparent from the description, or may be learned by practice of the presented embodiments.

According to an embodiment, a method performed in an electronic apparatus that shares photographing setting values includes: receiving an image list, including a plurality of images including the photographing setting values, from an external device connected to the electronic apparatus via a network; displaying the image list; and capturing an image of a subject based on photographing setting values included in an image selected from the image list.

The image list may be created based on one or more images that are created by a plurality of other electronic apparatuses connected to the external device via the network and transmitted to the external device.

The displaying of the image list may include displaying images from the image list that are classified based on at least one of a ranking, a category, or a creation order.

While a previous image to which the photographing setting values included in the selected image are not applied and a next image to which the photographing setting values included in the selected image have been applied are being displayed, at least one of a download selection button, a preference selection button, or preference of the selected image may be displayed.

The method may further include downloading the selected image based on a selection signal corresponding to the download selection menu.

The method may further include: displaying a live view image including the subject; identifying the subject and suggesting a plurality of images corresponding to the identified subject in a ranking order; and capturing the image of the subject based on photographing setting values included in an image selected from the suggested plurality of images.

Displaying of the image list may include displaying whether the photographing setting values are applied depending on the type of the electronic apparatus.

The method may further include classifying the plurality of images included in the image list based on the types of the plurality of other electronic apparatuses. An image that does not match with the type of the electronic apparatus from the plurality of images included in the image list may be processed to be displayed opaquely.

The method may further include changing the photographing setting values included in the selected image to photographing setting values supported by the electronic apparatus when the photographing setting values included in the selected image are within a range of photographing setting values not supported by the electronic apparatus.

According to an embodiment, a method performed in an electronic apparatus that shares photographing setting values includes: displaying a first image list created by classifying a plurality of images, including photographing setting values and features, based on at least one of a ranking, a category, or a creation order; receiving an upload request signal for an image selected from the first image list; and uploading the selected image to an external device connected to the electronic apparatus via a network based on the upload request signal.

The method may further include: receiving a revision number corresponding to a second image list stored in the external device; comparing the received revision number with a revision number corresponding to the first image list; and downloading the second image list from the external device when the revision number corresponding to the second image list is different from the revision number corresponding to the first image list.

The method may further include: creating an image, the created image including at least one of image data, photographing setting values used to capture the created image, a text describing features of the created image, a creation date of the created image, a creator of the image, or an electronic apparatus type; and adding the created image to the first image list.

According to an embodiment, an electronic apparatus that shares photographing setting values includes: a communication unit that communicates with an external device connected to the electronic apparatus via a network; an image list receiving unit that receives an image list, including a plurality of images including the photographing setting values, from the external device; and a control unit that displays the image list and captures an image of a subject based on photographing setting values included in an image selected from the image list.

The image list may be created based on one or more images that are created by a plurality of other electronic apparatuses connected to the external device via the network and transmitted to the external device.

The control unit may display images from the image list that are classified based on at least one of a ranking, a category, or a creation order.

The control unit may display at least one of a download selection menu, a preference selection menu, or a preference selection number of the selected image while displaying a previous image to which the photographing setting values included in the selected image are not applied and a next image to which the photographing setting values included in the selected image have been applied.

The electronic apparatus may further include an image download unit that downloads the selected image based on a selection signal corresponding to the download selection menu.

The control unit may display a live view image including the subject, identify the subject, suggest a plurality of images corresponding to the identified subject in a ranking order, and capture the image of the subject based on photographing setting values included in the image selected from the suggested plurality of images.

The control unit may display whether the photographing setting values are applied depending on the type of the electronic apparatus.

The electronic apparatus may further include an image classification unit that classifies the plurality of images included in the image list based on the types of the plurality of other electronic apparatuses. The control unit may process an image that does not match with the type of the electronic apparatus from the plurality of images included in the image list so as to be displayed opaquely.

The electronic apparatus may further include an image transformation unit that changes the photographing setting values included in the selected image to photographing setting values supported by the electronic apparatus when the photographing setting values included in the selected image are within a range of photographing setting values not supported by the electronic apparatus.

According to an embodiment, an electronic apparatus that shares photographing setting values includes: a control unit that displays a first image list created by classifying a plurality of images, including photographing setting values and features, based on at least one of a ranking, a category, or a creation order and receives an upload request signal for an image selected from the first image list; and an image upload unit that uploads the selected image to an external device connected to the electronic apparatus via a network based on the upload request signal.

The control unit may receive a revision number corresponding to a second image list stored in the external device, compare the revision number as received with a revision number corresponding to the first image list, and download the second image list from the external device when the revision number corresponding to the second image list is different from the revision number corresponding to the first image list.

The electronic apparatus may further include an image creation unit that creates an image. The created image may include at least one of an image, photographing setting values used to capture the created image, a text describing features of the created image, a creation date of the created image, or a creator of the created image. The control unit may add the created image to the first image list.

According to an embodiment, a photographing setting value sharing system which is connected to a plurality of electronic apparatuses via a network includes: an image receiving unit that receives images, each received image including photographing setting values from the corresponding electronic apparatus of the plurality of electronic apparatuses; an identifier (ID) assign unit that assigns IDs to the received images in an order in which the received images are received; an image storage unit that stores a plurality of images based on the IDs in a database; an image list creation unit that creates an image list by classifying the plurality of images in the database based on at least one of a ranking, a category, or a creation order; an image ranking calculation unit that calculates a ranking of an image received from at least one of the plurality of electronic apparatuses when the at least one of the plurality of electronic apparatuses selects at least one of a download or preference of the image received from the at least one of the plurality of electronic apparatuses; and an image suggestion unit that suggests images, having rankings calculated by the image ranking calculation unit, to the plurality of electronic apparatuses.

The ID assign unit may assign IDs that are classified based on manufacturing companies, experts, or users of the plurality of electronic apparatuses.

The image ranking calculation unit may calculate rankings of the received images classified based on the types of the corresponding electronic apparatus of the plurality of electronic apparatuses.

Each of the received images may include at least one of image data, photographing setting values used to capture the received image, a text describing features of the received image, a creation date of the received image, a creator of the received image, or an electronic apparatus type.

The image list may be transmitted to the plurality of electronic apparatuses connected to the photographing setting value sharing system via the network.

According to an embodiment, a non-transitory computer-readable recording medium having recorded thereon a program for executing a method including the steps of: receiving an image list, including a plurality of images including the photographing setting values, from an external device connected to the electronic apparatus via a network; displaying the image list; and capturing an image of a subject based on photographing setting values included in an image selected from the image list.

BRIEF DESCRIPTION OF THE DRAWINGS

These and/or other embodiments will become apparent and more readily appreciated from the following description of various embodiments, taken in conjunction with the accompanying drawings in which:

FIG. 8 is a view of a table for describing assignment of image identifiers (IDs) in the sharing system of FIG. 1;

DETAILED DESCRIPTION

Figure 1:
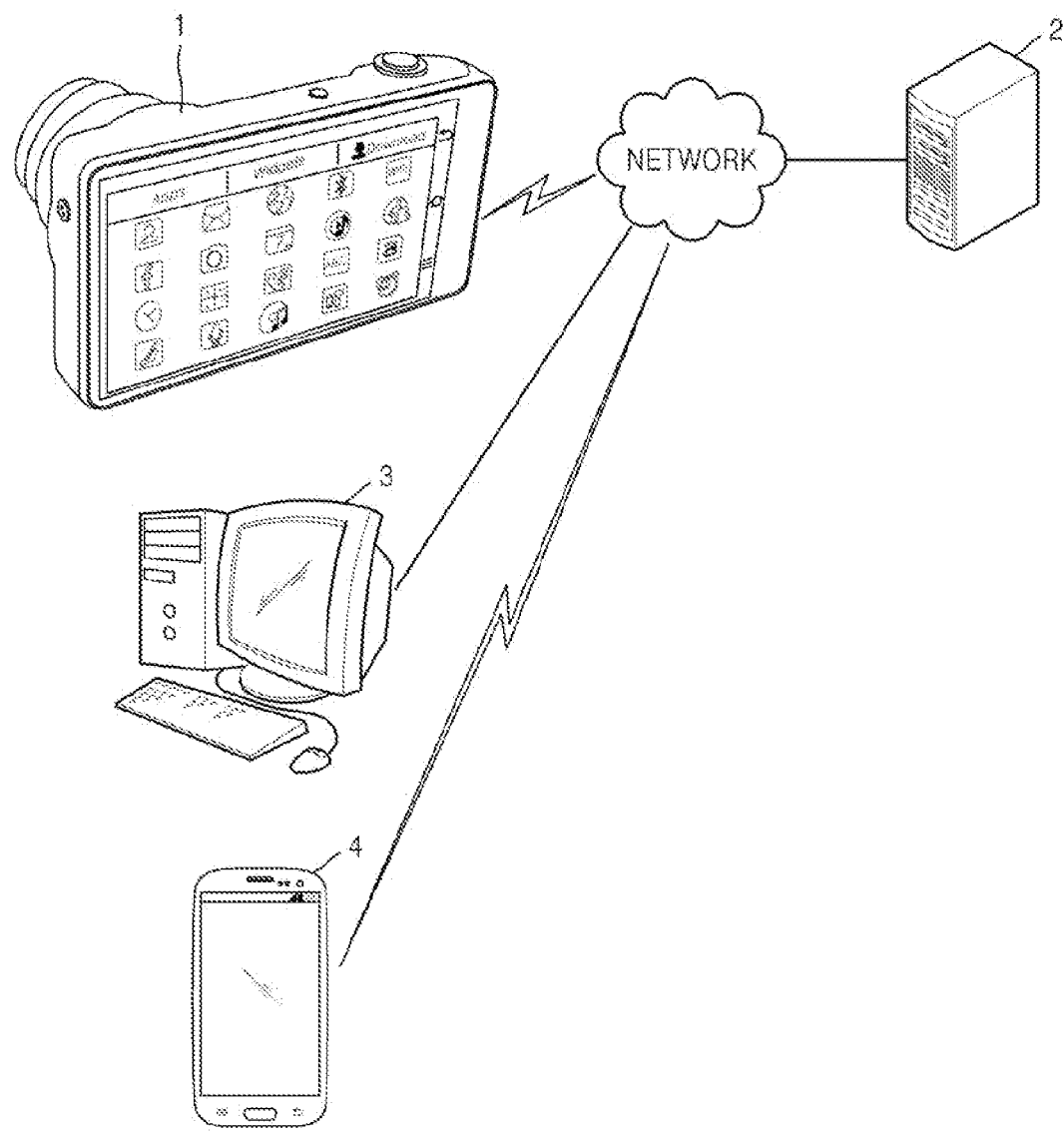
FIG. 1 illustrates an electronic apparatus and a sharing system that are connected to each other via a network.

As the invention allows for various changes and numerous embodiments, various embodiments will be illustrated in the drawings and described in detail in the written description. However, this is not intended to limit the present embodiments to particular modes of practice, and it is to be appreciated that all changes, equivalents, and substitutes that do not depart from the spirit and technical scope of the present embodiments are encompassed in the present embodiments. In the description, certain detailed explanations of the related art are omitted when it is deemed that they may unnecessarily obscure the essence of the invention. Expressions such as "at least one of," when preceding a list of elements, modify the entire list of elements and do not modify the individual elements of the list.

The terms used in the present specification are merely used to describe exemplary embodiments, and are not intended to limit the present disclosure. No item or component is essential to the practice of the invention unless the element is specifically described as "essential" or "critical". An expression used in the singular encompasses the expression of the plural, unless it has a clearly different meaning in the context. It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

Hereinafter, various embodiments will be described in detail by explaining the embodiments with reference to the attached drawings. Like reference numerals in the drawings denote like elements, and a repeated description thereof will be omitted.

Although a digital camera is illustrated as an electronic apparatus in some embodiments below, embodiments of the invention are not limited thereto, and may be applied to other digital apparatuses, such as digital camcorders, personal digital assistants (PDAs), smartphones, or other electronic devices having image capturing capabilities.

FIG. 1 illustrates an electronic apparatus 1 and a sharing system 2 that are connected with each other via a network. The electronic apparatus 1 may produce, as an object or data structure, a collection of photographing setting values in a digital form as an image, and the sharing system 2 may assign a unique identifier (ID) to each image received from the electronic apparatus 1. The sharing system 2 may receive an image including photographing setting values from one or more of the electronic apparatus 1, a personal computer (PC) 3, or a mobile device 4, and may store and manage the received images. Accordingly, the electronic apparatus 1 may easily and quickly share images with other electronic apparatuses (e.g., the PC 3 and mobile device 4) via the sharing system 2.

Even when a user does not know an identifier for an electronic apparatus of another user, the sharing system 2 may serve as a manager and may easily and quickly share photographing setting values that are set in the electronic apparatus of another user. Even when other new electronic apparatuses are developed over time, the sharing system 2 may transform existing images based on the new electronic apparatuses so that the existing images may be re-used by the new electronic apparatus. Although different products belong to different groups, they may commonly use images and may easily and quickly share an image list in a descending order of ranking by applying a number of downloads or suggestions.

The electronic apparatus 1 may capture an image to create an image file and may directly or indirectly transmit the image file to the sharing system 2, the PC 3, or the mobile device 4 via a wired or wireless communication network. The electronic apparatus 1 may be a digital single-lens reflex (DSLR) camera, a mirror-less camera, or a smartphone, but is not limited thereto. The electronic apparatus 1 may be any apparatus that includes a camera module capable of creating an image by photographing a subject by using a lens and an image pickup device included therein.

The sharing system 2 may be able to provide a cloud service or a social network service. The sharing system 2 stores an image received from the electronic apparatus 1, the PC 2, or the mobile device 4. A detailed structure of the sharing system 2 will be described below with reference to FIG. 4.

The mobile device 4 may be a notebook, a mobile phone, a tablet PC, or a smartphone, but is not limited thereto. The mobile device 4 may include a code division multiplexing access (CDMA) module, a Bluetooth module, an infrared communication module, or a communication module such as a wired or wireless LAN card, and may be interpreted as a general term for mobile communication terminals have a processor capable of performing a multimedia reproduction function.

Figure 2:
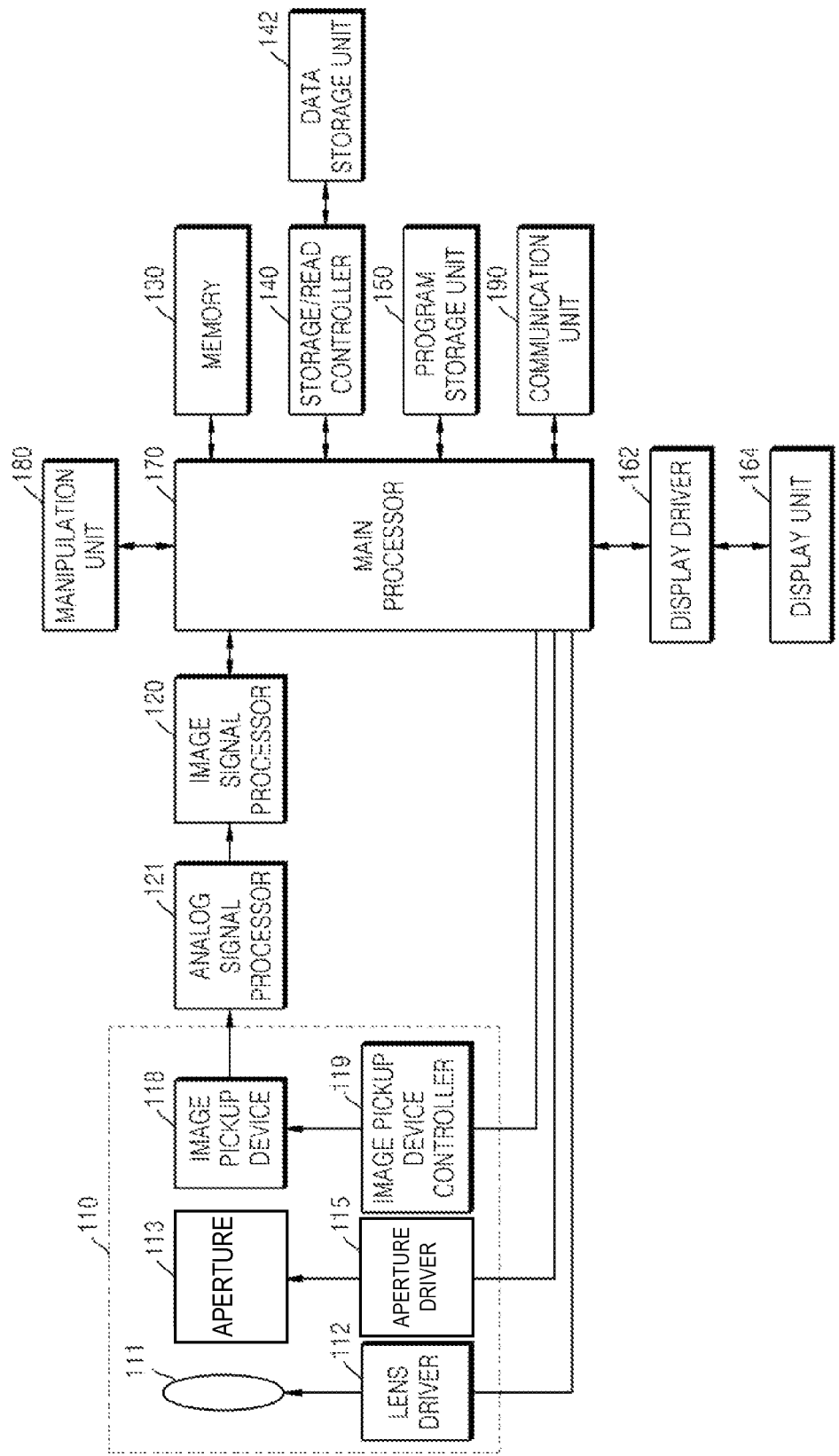
FIG. 2 is a schematic block diagram of the electronic apparatus illustrated in FIG. 1, according to an embodiment.

FIG. 2 is a schematic block diagram of the electronic apparatus 1 of FIG. 1, according to an embodiment.

Referring to FIG. 2, the electronic apparatus 1 may include a photographing unit 110, an image signal processor 120, an analog signal processor 121, a memory 130, a storage/read controller 140, a data storage unit 142, a program storage unit 150, a display driver 162, a display unit 164, a main processor 170, and a manipulation unit 180.

The main processor 170 controls an overall operation of the electronic apparatus 1. The main processor 170 provides control signals to a lens driver 112, an aperture driver 115, and an image pickup device controller 119 for the operations of the lens driver 112, the aperture driver 115, and the image pickup device controller 119.

The photographing unit 110 is a component for generating an electrical signal representing incident light. The photographing unit 110 includes a lens 111, the lens driver 112, an aperture 113, the aperture driver 115, an image pickup device 118, and the image pickup device controller 119. The lens 111 may include a plurality of groups of lenses. A position of the lens 111 is controlled by the lens driver 112. The lens driver 112 controls a position of the lens 111 based on a control signal provided from the main processor 170. A degree of opening of the aperture 113 is controlled by the aperture driver 115, thereby controlling the amount of light incident on the image pickup device 118. An optical signal transmitted through the lens 111 and the aperture 113 forms an image of an object on a light-receiving side of the image pickup device 118. The image pickup device 118 may be a Charge-Coupled Device (CCD) image sensor or a Complementary Metal-Oxide Semiconductor Image Sensor (CIS) that converts an optical signal to an electrical signal. The sensitivity or the like of the image pickup device 118 may be controlled by the image pickup device controller 119. The image pickup device controller 119 may control the image pickup device 118 based on a control signal automatically generated by a real-time input image signal or a control signal manually input by a user via the manipulation unit 180. The analog signal processor 121 performs one or more of noise reduction, gain adjustment, waveform shaping, or analog-to-digital conversion (ADC), etc. on an analog signal generated and provided from the image pickup device 118.

The image signal processor 120 performs one or more functions on an image data signal obtained by the analog signal processor 121. The image signal processor 120 may reduce noise of input image data and perform image signal processing for image quality improvement and various effects, such as gamma correction, color filter array interpolation, color transforms, color correction, color enhancement, white balance adjustment, brightness smoothing, or color shading. The image signal processor 120 may generate an image file by compressing input image data, or may restore the image data from the image file. A compression format of an image may be a reversible format or an irreversible format. Examples of an appropriate format for a still image may include a Joint Photographic Experts Group (JPEG) format and a JPEG 2000 format. In addition, when a moving picture is recorded, a video file may be generated by compressing a plurality of frames according to a Moving Picture Experts Group (MPEG) standard. An image file may be generated, for example, in accordance with the Exchangeable image file format (Exif) standard.

The image signal processor 120 may generate a video file from an image pickup signal generated by the image pickup device 118. The image pickup signal may be a signal obtained by processing a signal generated by the image pickup device 118 by using the analog signal processor 121. The image signal processor 120 may produce frames, which are to be included in the video file, from the image pickup signal, encode the frames according to a standard, for example, the Moving Picture Experts Group 4 (MPEG4), H.264/AVC, or the windows media video (WMV) standard, compress the encoded frames into a moving picture, and create a video file based on the moving picture. The video file may be created in any of various file formats, such as mpg, mp4, 3gpp, avi, asf, and mov.

The image data output from the image signal processor 120 is input to the storage/read controller 140 directly or via the memory 130. The storage/read controller 140 stores the image data in the data storage unit 142 automatically or based on a signal from the user. The storage/read controller 140 may read data for an image from an image file stored in the data storage unit 142 and provide the read data to the display driver 162 via the memory 130 or another path to display an image on the display unit 164. The data storage unit 142 may be detachably installed or fixed on the electronic apparatus 1.

The image signal processor 120 may also perform processing such as obscurity processing, color processing, blur processing, edge emphasis processing, image analysis processing, image recognition processing, image effect processing, etc. on the input image data. Face recognition, scene recognition, or the like may be performed as the image recognition processing. The image signal processor 120 may also perform display image signal processing to display an image on the display unit 164. For example, the image signal processor 120 may perform brightness level adjustment, color correction, contrast adjustment, contour emphasis adjustment, screen division, creation of a character image, and the like, and image synthesis.

A signal output from the image signal processor 120 may be input to the main processor 170 directly or via the memory 130. Herein, the memory 130 operates as a main memory of the electronic apparatus 1 and temporarily stores information necessary for an operation of the image signal processor 120 or the main processor 170. The program storage unit 150 may store programs, such as an operating system for driving the electronic apparatus 1 and an application system.

The electronic apparatus 1 includes the display unit 164 for displaying an operation state of the electronic apparatus 1 or information regarding an image captured by the electronic apparatus 1. The display unit 164 may provide visual information and/or auditory information to a user. To provide the visual information, the display unit 164 may include, for example, a Liquid Crystal Display (LCD), or an Organic Light-Emitting Display (OLED). The display unit 164 may be a touch screen for receiving a touch input.

The display driver 162 generates and provides a driving signal to the display unit 164.

The main processor 170 may process an input image signal and control corresponding components of the electronic apparatus 1 based on the processed image signal or an input signal from the outside. The main processor 170 may be a single processor or a plurality of processors. The main processor 170 may be an array of a plurality of logic gates, or may be a combination of a general-use microprocessor and a memory that stores a program that is executable in the general-use microprocessor. It will be understood by one of ordinary skill in the art that the main processor 170 may be any of the other types of hardware.

In addition, the main processor 170 may generate control signals for controlling, for example, Auto Focusing (AF), a zoom change, a focus change, and Auto Exposure (AE) correction, by executing programs stored in the memory 130 or using a separate module, to provide the control signals to the aperture driver 115, the lens driver 112, and the image pickup device controller 119, and may generally control operations of components included in the electronic apparatus 1, such as a shutter and a strobe.

The main processor 170 may be connected to an external monitor (not shown), perform predetermined image signal processing on the image signal received from the image signal processor 120 so that an image is displayed on the external monitor, and transmit processed image data to the external monitor so that a corresponding image is displayed on the external monitor.

Through the manipulation unit 180, the user may input one or more control signals. The manipulation unit 180 may include various functional buttons, such as a shutter-release button for inputting a shutter-release signal to take a picture by exposing the image pickup device 118 to light for a predetermined period of time, a power button for inputting a control signal to control power of the electronic apparatus 1 ON or OFF, a zoom button for widening or narrowing a viewing angle based on a user input, a mode selection button, or other photograph setting value adjustment buttons. The manipulation unit 180 may be implemented by any means enabling a user to input a control signal, for example, by a button, a keyboard, a touch pad, a touch screen, or a remote controller.

A communication unit 190 may include a network interface card (NIC), a modem, or the like, and may enable the electronic apparatus 1 to communicate with an external apparatus (i.e., the sharing system 2, the PC 3, or the mobile device 4 of FIG. 1) via a wired or wireless network.

Figure 3:
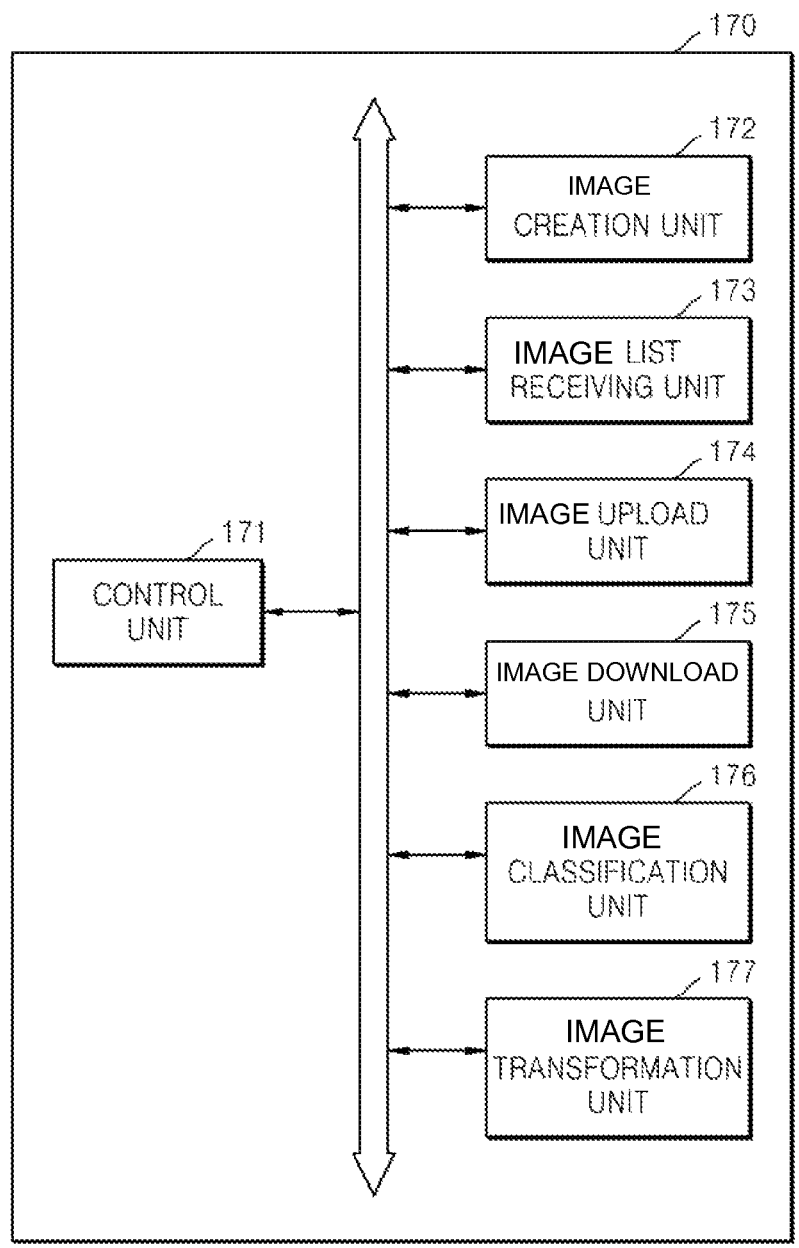
FIG. 3 is a schematic block diagram of a main processor included in the electronic apparatus of FIG. 2.

FIG. 3 is a schematic block diagram of the main processor 170 of FIG. 2, according to an embodiment.

Referring to FIG. 3, the main processor 170 includes a control unit 171, an image creation unit 172, an image list receiving unit 173, an image upload unit 174, an image download unit 175, an image classification unit 176, and an image transformation unit 177. Although the main processor 170 as illustrated in the embodiment of FIG. 3 includes all of the aforementioned components, in alternative embodiments, the main processor 170 may include only some of the components (e.g., the image creation unit 172, the image list receiving unit 173, and image download unit 175) to perform functions of creating an image, receiving an image list from the sharing system 2, and downloading a desired image from the image list, in order to share photographing setting values. The main processor 170 in some embodiments may be understood as having the same meaning as an electronic apparatus described in the claims.

The image creation unit 172 in one example defines an image file as a collection of photographing setting values for image processing, a text describing the features of the image, an image (e.g., data representing an image), a creation date, a creator, and the like. Examples of the photographing setting values may include sharpness, contrast, saturation, and the like that are related to an aperture AV, a shutter speed TV, a white balance, and a color tone.

Figure 5A:
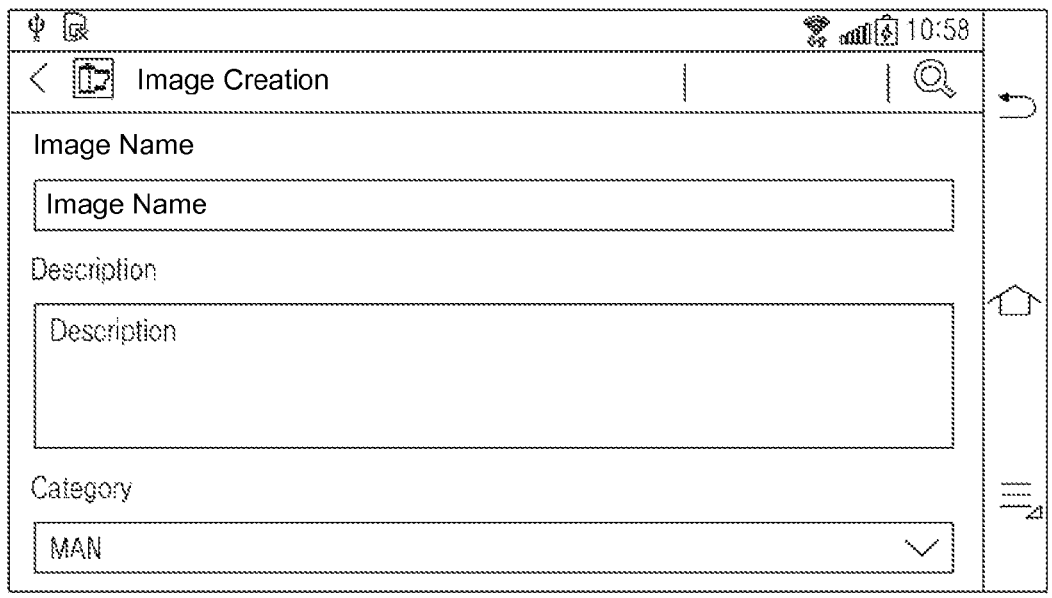
FIG. 5A and FIG. 5B are views of interfaces for describing image creation in the electronic apparatus of FIG. 1.
Figure 5B:
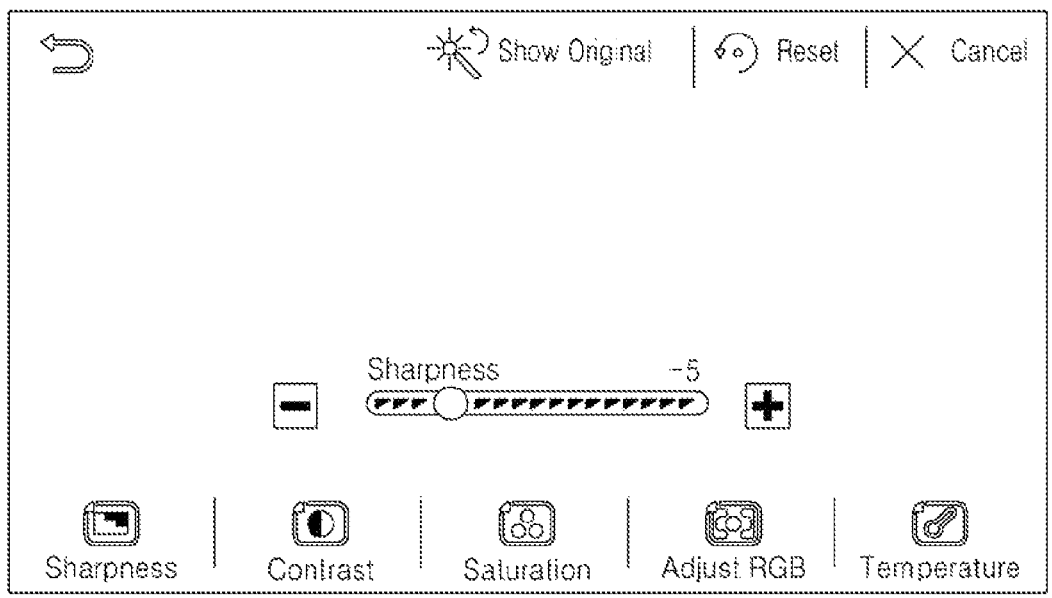

As illustrated in FIG. 5A and FIG. 5B, the electronic apparatus 1 may provide an image creation tool. A user may create an image based on the image creation tool provided by the electronic apparatus 1 and may store the image in the memory 130 of FIG. 2.

Figures 6, 7:
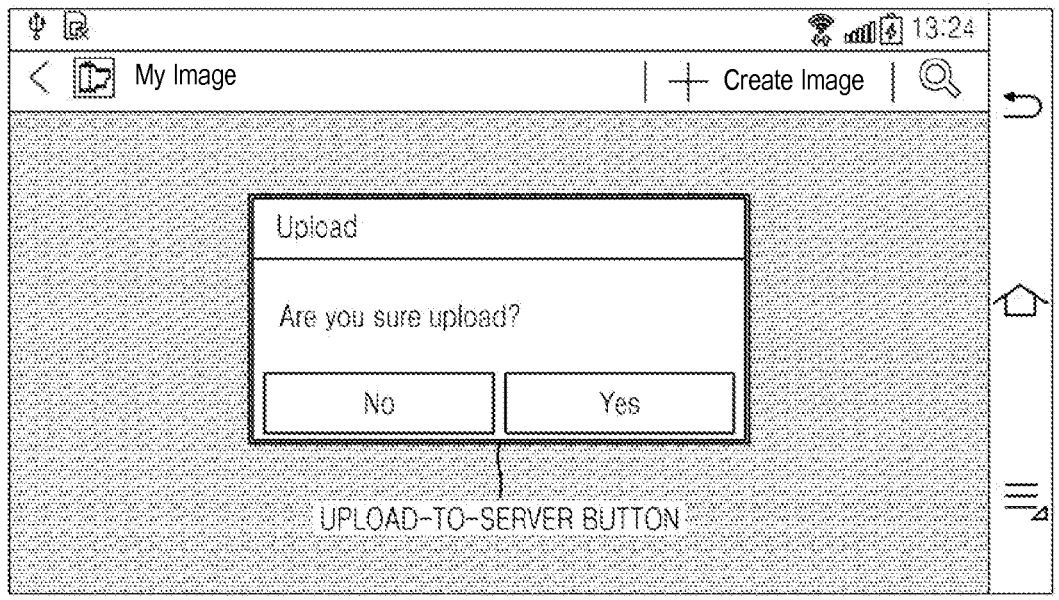
FIG. 6 is a view of an interface of an image list according to an embodiment.
FIG. 7 is a view of an interface for describing uploading of a created image from the electronic apparatus of FIG. 1 into the sharing system of FIG. 1.

The memory 130 may store, as a database, an image list (i.e., a list of a plurality of image files) produced by the image creation unit 172 under the control of the control unit 171. The image list may include the attribute values of the image files within the image list. The stored images may be classified and displayed based on particular tabs, for example, a ranking or popularity order, a creation order, a category, and a photographing mode. As illustrated in FIG. 6, images, such as "night scene light beam", "flame", "Singapore Mariani Sand", and "Hong Kong scenery", may be displayed in a ranking tab, and images classified based on a creation order (e.g., New for a chronological order) and images classified based on category are displayed.

The image upload unit 174 uploads image files stored in the memory 130 of the electronic apparatus 1, into the sharing system 2. As illustrated in FIG. 7, under the control of the control unit 171, the image upload unit 174 may upload a selected image from the image list of FIG. 6 to the sharing system 2, or may upload an image created based on an image creation tool, as illustrated in FIGS. 5A and 5B, to the sharing system 2.

The image list receiving unit 173 may periodically receive an image list from the sharing system 2. The sharing system 2 may provide an image list at regular time intervals (e.g., via a push transmission technique). The sharing system 2 may produce a revision number of an image list of the sharing system 2 and transmit the revision number to the electronic apparatus 1. When the produced revision number is different from a revision number of the electronic apparatus 1, the image list receiving unit 173 may determine that updating is necessary, and then receive the image list from the sharing system 2.

When the electronic apparatus 1 receives a new or updated image list, for example, the image list of FIG. 6, from the sharing system 2, the image download unit 175 downloads an image selected by a user from the sharing system 2.

The image classification unit 176 may classify images based on product groups into which the electronic apparatus 1 is sorted. Electronic apparatuses may be divided into several product groups. For example, products may be classified into groups so that models having similar specifications may be grouped. For example, image types may be defined based on electronic apparatus groups as in Table 1 below.

TABLE 1

| Image type | Product group | photographing setting value range |
| --- | --- | --- |
| 0 | Any | Any regardless of product groups, or no information |
| 1 | smartphone electronic apparatus | Small |
| 2 | general electronic apparatus | Medium e.g.) Many ranges such as a zoom range, an AV range, a TV range, and a sensitivity range can be set. |
| 3 | interchangeable lens electronic apparatus | Large e.g.) An aperture value range for each lens in addition to the above |

The electronic apparatus 1 defines a suitable image type value so that the predefined image type value is input when an image is created in the electronic apparatus 1. Alternatively, the sharing system 2 may assign an image type value. If the sharing system 2, instead of the electronic apparatus 1, creates an image, the sharing system 2 may define an image type for the electronic apparatus 1. In this case, the sharing system 2 may designate 0 as an image type, in contrast with the electronic apparatus 1. This corresponds to the case where actual photographing setting values can be used in all product groups. For example, since elements corresponding to post processing, such as contrast, sharpness, saturation, and color tone, can be performed in all electronic apparatuses regardless of product groups, an image type may be set to 0.

Figure 11:
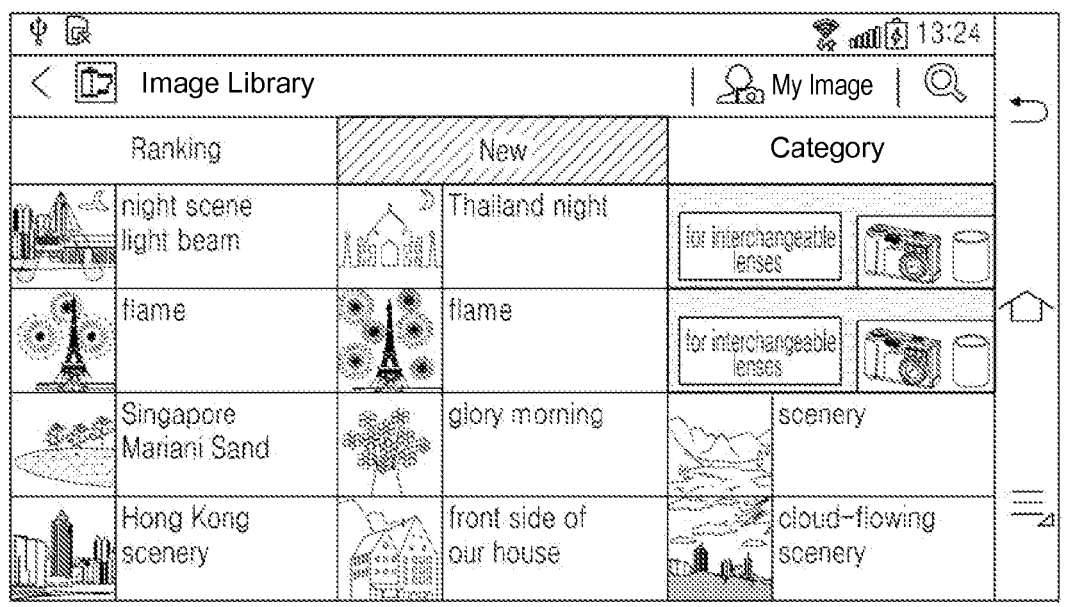
FIG. 11, FIG. 12, and FIG. 13 are views of interfaces according to classification of electronic apparatuses into product groups.
Figure 12:
Figure 13:

Referring to FIG. 11, FIG. 12, and FIG. 13, when the image classification unit 176 distinguishes a first image having an image type value that matches with a product group of the electronic apparatus 1 from a second image having an image type value that does not match with a product group of the electronic apparatus 1 and downloads the distinguished images, the distinguished images may be displayed on the display unit 164 of the electronic apparatus 1.

As illustrated in FIG. 11, when the electronic apparatus 1 is a smartphone electronic apparatus and a user establishes communication with the sharing system 2 in order to download an image, if the image type of the image does not match with a smartphone electronic apparatus group or an "any" group, the image may be processed and displayed opaquely (e.g., represented by an icon or other indication). Although it has been described herein that the image is processed and seen opaquely on an image list downloaded from the sharing system 2, the same processing may be applied to an image list stored in the electronic apparatus 1. For example, as illustrated in FIG. 11, images for interchangeable lenses may be processed and displayed opaquely on an image list, and an expression "image for interchangeable lenses" may be displayed on the image list. Accordingly, since it is difficult for a smartphone electronic apparatus to exhibit an aperture (AV) effect, a user may be informed via this image classification.

As illustrated in FIG. 12, when the image type of a downloaded image does not correspond to a product group of the electronic apparatus 1 or when a small effect is exhibited when the photographing setting values included in the downloaded image are applied to the electronic apparatus 1, the image may not be displayed. Thus, only images whose image types match with a product group of the electronic apparatus 1 may be displayed.

As illustrated in FIG. 13, when the electronic apparatus 1 is an interchangeable lens electronic apparatus, the types of lenses may be displayed.

When the image type value of a downloaded image does not match with a product group of the electronic apparatus 1, the image transformation unit 177 transforms the photographing setting values included in the downloaded image to valid photographing setting values. In addition, the image transformation unit 177 may determine whether the valid photographing setting values included in the downloaded image are valid in the electronic apparatus 1.

The image transformation unit 177 has a table showing photographing setting values (for example, an aperture and a shutter speed) that may vary depending on a product group. When the photographing setting values included in an image downloaded from the sharing system 2 deviate from valid ranges or when the photographing setting values do not match with a product group of the electronic apparatus 1, the image transformation unit 177 transforms the photographing setting values of the downloaded image to values that are within the valid ranges. The image transformation unit 177 has a valid range (a minimum to maximum range) of each photographing setting value available in the electronic apparatus 1, and determines whether the photographing setting values of the downloaded image are within the valid ranges. When the photographing setting values of the downloaded image deviate from the valid ranges, the image transformation unit 177 sets the photographing setting values of the downloaded image to be most approximate values that are within the valid ranges. When the photographing setting values of the downloaded image do not exactly match with the electronic apparatus 1 although they are within the valid ranges, the image transformation unit 177 sets the photographing setting values of the downloaded image to be most approximate values that are within the valid ranges. For example, when the electronic apparatus 1 is a smartphone electronic apparatus only supporting an aperture value of F3.5 but the aperture value of an image downloaded from the sharing system 2 is F1.0, the image transformation unit 177 may transform the photographing setting value, namely, the aperture value, to F3.5.

Figure 4:
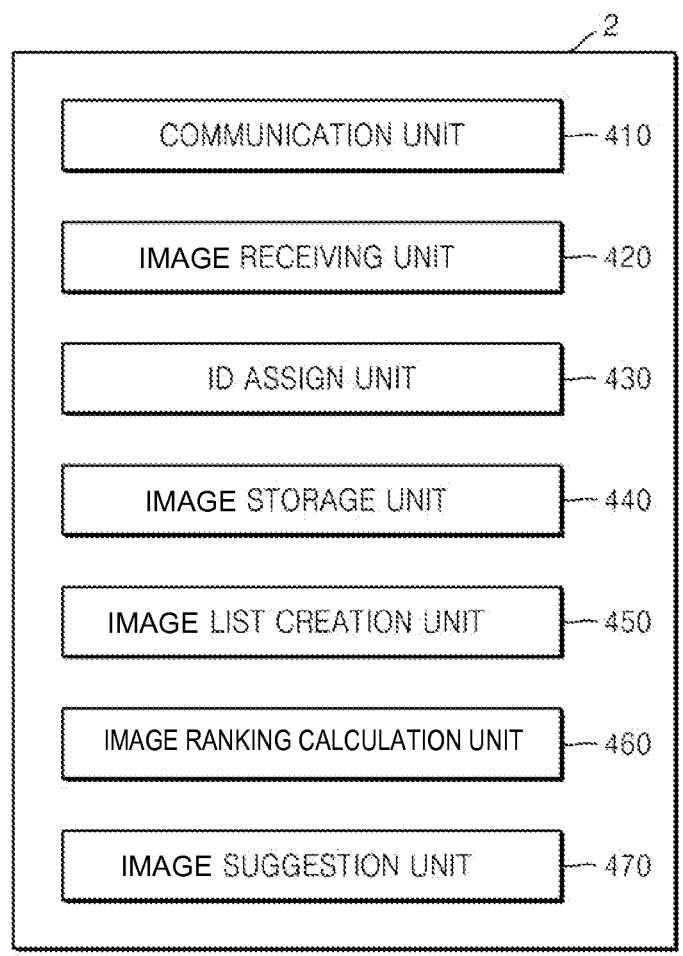
FIG. 4 is a schematic block diagram of the sharing system illustrated in FIG. 1.

FIG. 4 is a schematic block diagram of the sharing system 2 of FIG. 1.

Referring to FIG. 4, the sharing system 2 may be connected to a plurality of electronic apparatuses via a network and may be a computer or network server.

The sharing system 2 includes a communication unit 410, an image receiving unit 420, an ID assign unit 430, an image storage unit 440, an image list creation unit 450, an image ranking calculation unit 460, and an image suggestion unit 470. Although the embodiment of the sharing system 2 illustrated in FIG. 4 includes all of the aforementioned components, any of the components may be omitted as needed. The sharing system 2 is a storage that is separate from the electronic apparatus 1 and may be connected to the electronic apparatus 1 via a wired or wireless network, for example, 2G, 3G, 4G, or Wi-Fi networks. The sharing system 2 may be separately provided in a webpage form. Alternatively, the electronic apparatus 1 may transmit an image list via an application programming interface (API) when the network server is implemented as a cloud server.

The communication unit 410 communicates with a plurality of electronic apparatuses (e.g., the electronic apparatus 1, PC 3, or mobile device 4) via a network.

The image receiving unit 420 receives images created by the electronic apparatuses.

The ID assign unit 430 sequentially assigns an ID when a new image is newly added by the electronic apparatus 1 or another electronic apparatus. At this time, the image may be created by and uploaded from the electronic apparatus 1, may be directly input and created via a web page by the sharing system 2, or may be directly input to the database and created by the sharing system 2. The ID assign unit 430 may divide users into different levels to assign IDs based on one or more of a manufacturing company level, a general user level, or a professional user level. For example, as illustrated in FIG. 8, when manufacturing companies create images, IDs of 1 through 100 may be assigned to the images. When professional users or photographers create images, IDs starting from an ID of 101 may be assigned to the images. When general users create images, IDs starting from an ID of 1001 may be assigned to the images. The ID assignment described with reference to FIG. 8 is an example, and thus, embodiments are not limited thereto. Various ID assignments may be possible based on subjects that upload images.

The image storage unit 440 stores the images that are transmitted by the electronic apparatuses. A database is established in the image storage unit 440. When an image is received from each of the electronic apparatuses, the images may be added to the database one at a time or in batches. Created images are stored in the database, and the images have their IDs and also titles, before/after images, descriptions, dates, time, and the like that describe the features of the images. The created images include photographing setting values.

The image list creation unit 450 lists the images stored in the database in the image storage unit 440 to create an image list as shown in FIG. 6.

Figure 9:
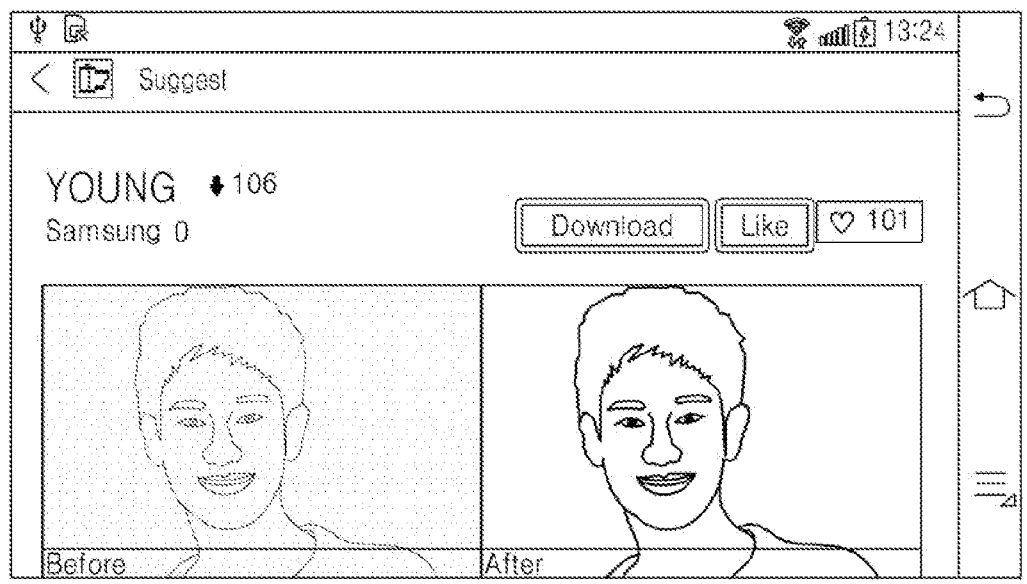
FIG. 9 is a view of an interface for describing calculation of image ranking.

When a particular image is downloaded from a particular electronic apparatus, the image ranking calculation unit 460 may provide a user interface (UI) via which a preference can be selected and may combine the number of downloads or preference selections to calculate a ranking of the downloaded image. A weight may be applied to the number of downloads or preference selections. As illustrated in FIG. 9, an option button "Download" allowing a user to download a particular image, and a button "Like" allowing a user to select his or her preference may be displayed on an electronic apparatus.

Figure 10:
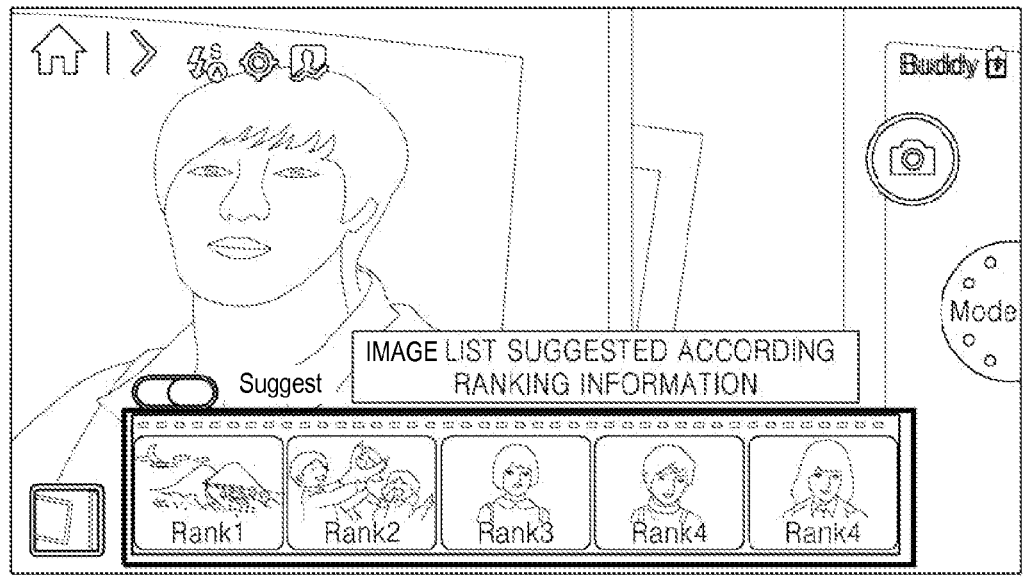
FIG. 10 is a view of an interface for describing image suggestion.

The image suggestion unit 470 suggests a particular image to a user based on ranking information calculated by the image ranking calculation unit 460. For example, as illustrated in FIG. 10, when a particular image is displayed, images matched with the particular image may be suggested in a ranking order. The electronic apparatus may display a live view image, identify a particular scene, scene type, or subject from the live view image, and suggest images corresponding to the identified scene, scene type, or subject in the ranking order. For example, when a face is photographed, the face may be recognized, and a plurality of images associated with face photography (e.g., a portrait type of image) may be suggested to a user in a descending order of ranking.

Different pieces of ranking information may be provided to different electronic apparatuses, or the same ranking information may be provided to different electronic apparatuses. When different pieces of ranking information are provided to different electronic apparatuses, the electronic apparatuses may be distinguished from each other via type information about the electronic apparatuses. For example, a smartphone electronic apparatus may be allocated a type value of 0, a general electronic apparatus may be allocated a type value of 1, and an interchangeable lens electronic apparatus may be allocated a type value of 2. The number of downloads and the number of preference selections are summed for each product group (e.g., a group with products having a type value of 0, a group with products having a type value of 1, etc.) to calculate ranking information for each product group.

Figure 14:
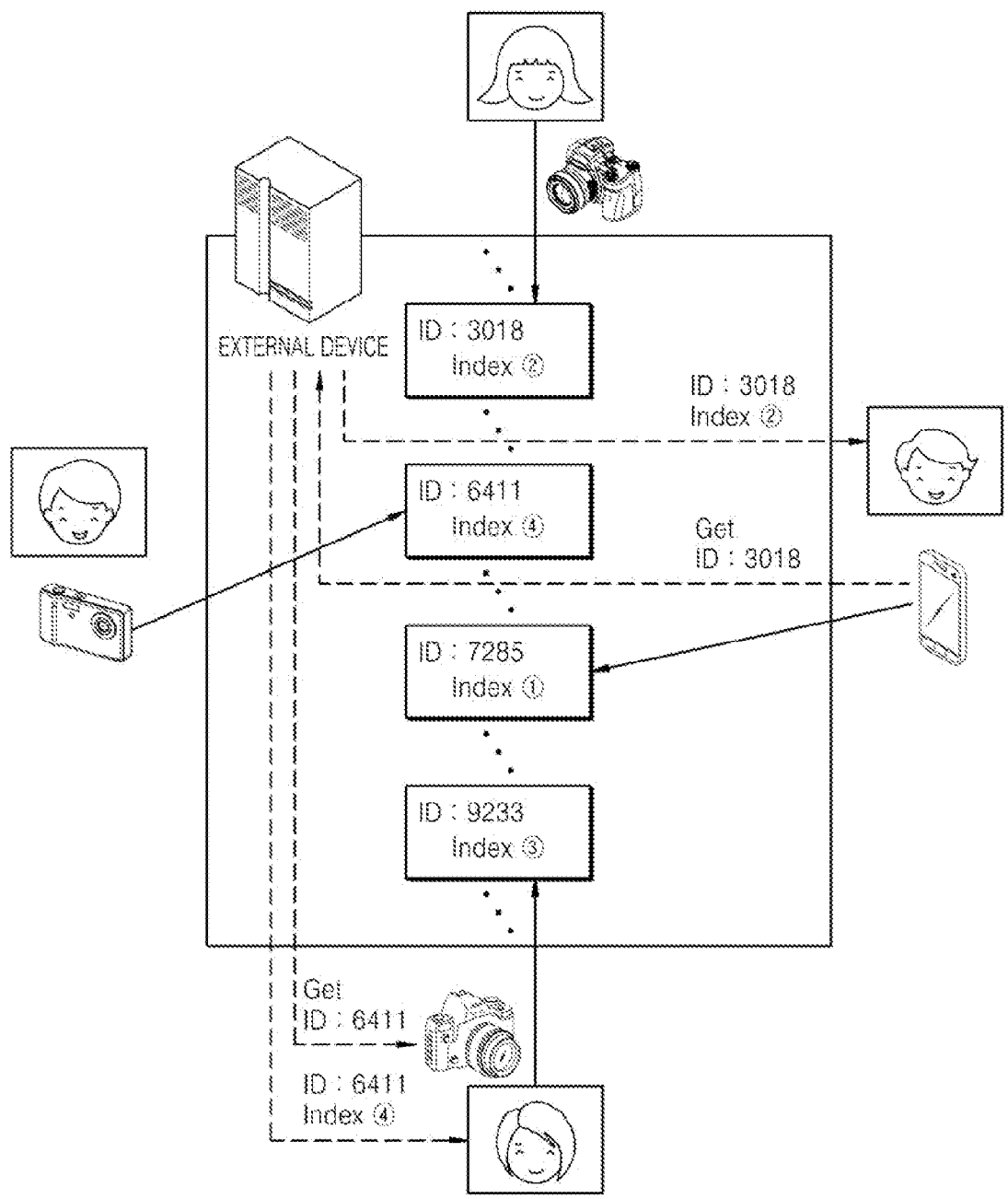
FIG. 14 and FIG. 15 are diagrams that illustrate a method of image sharing.
Figure 15:
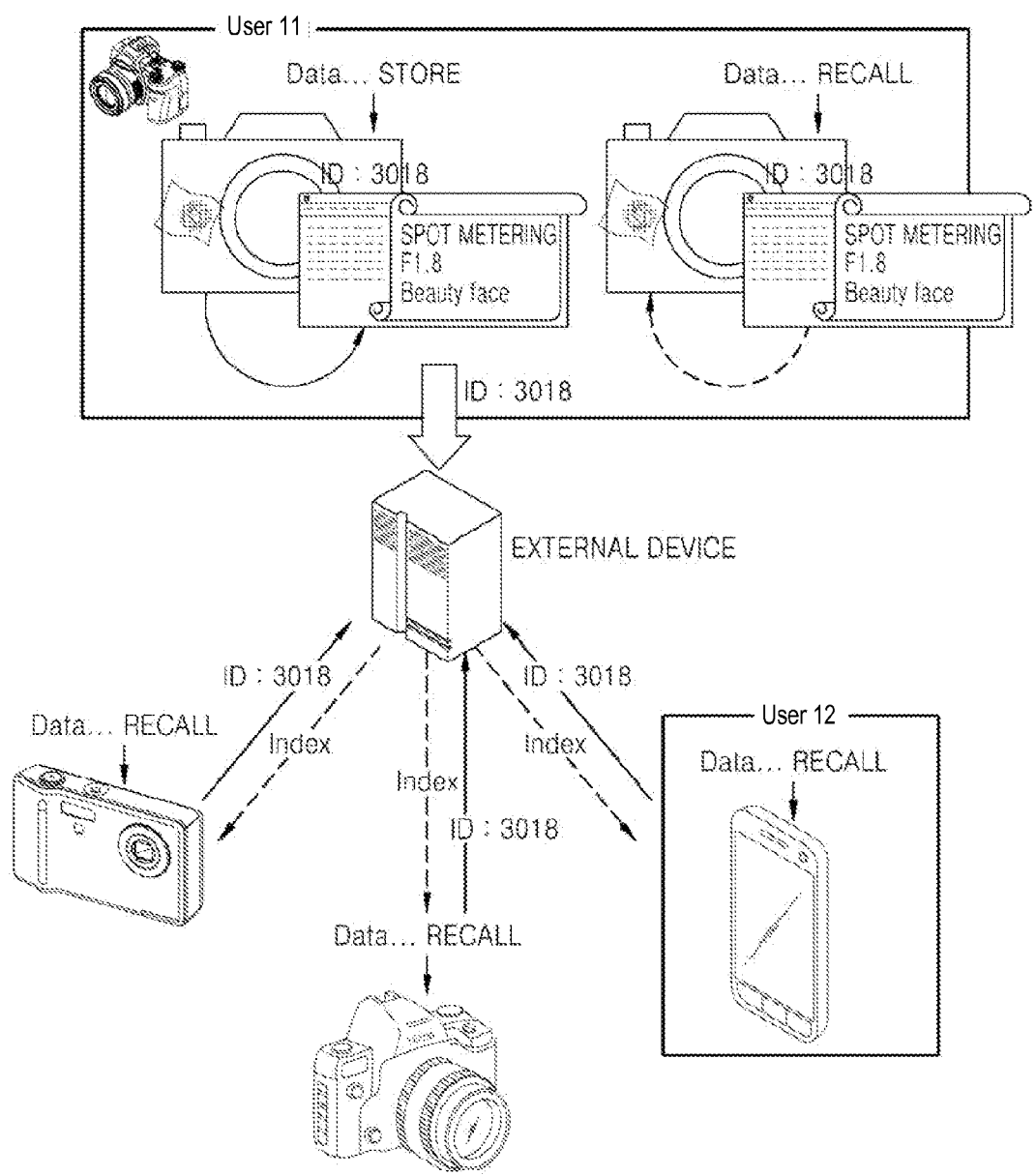

FIGS. 14 and 15 are exemplary diagrams for describing image sharing.

Referring to FIG. 14, a plurality of users may upload images having ID values of ID 3018, ID 6411, ID 7285, and ID 9233 into an external device or a sharing system, the sharing system may manage the images based on the IDs of the images, and the users may download certain images via the IDs of the images and store them in their electronic apparatuses.

Referring to FIG. 15, a user 11 may upload an image ID 3018 created by the user 11 into an external device or a sharing system, and a user 12 may download the image ID 3018 to his or her electronic apparatus and apply the photographing setting values of the image ID 3018 to his or her electronic apparatus.

Figure 16:
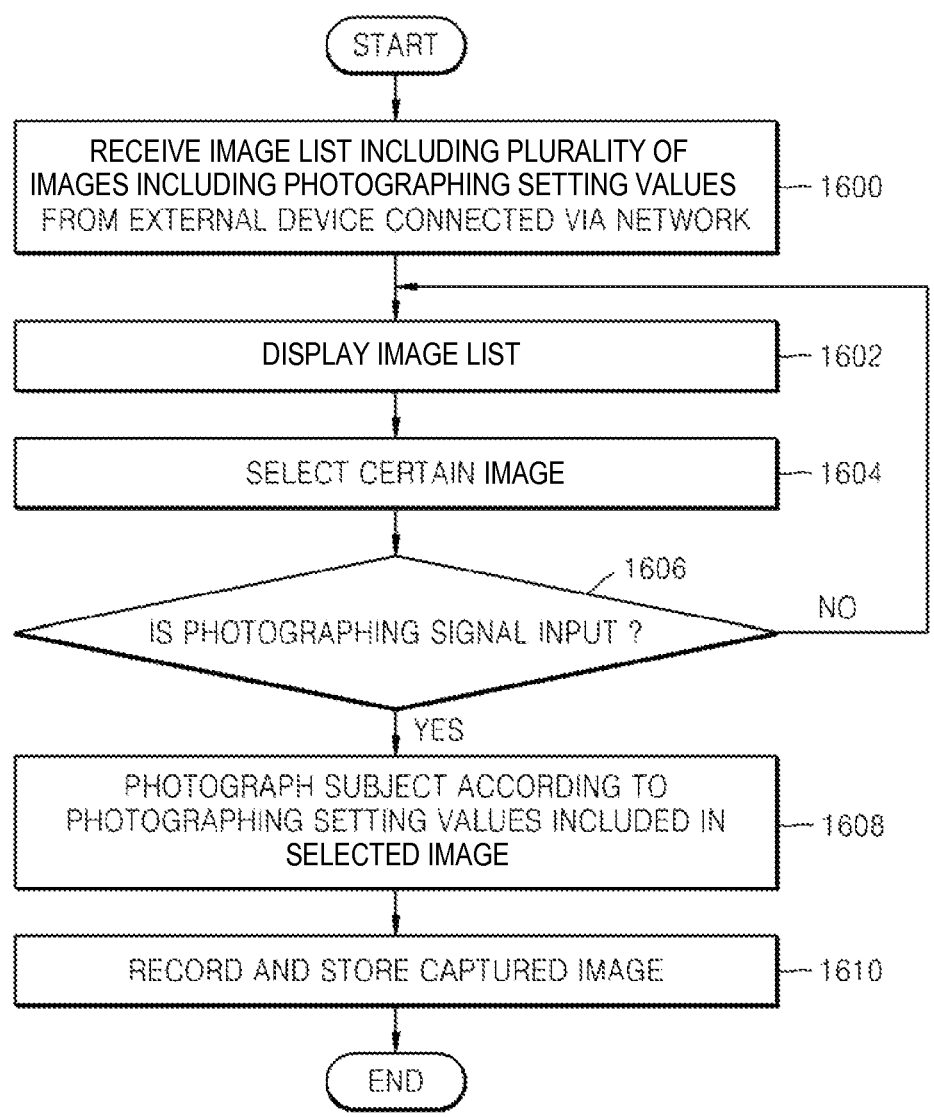
FIG. 16 is a flowchart of a controlling method performed in an electronic apparatus that shares photographing setting values with other electronic apparatuses, according to an embodiment.

FIG. 16 is a flowchart of a controlling method performed in an electronic apparatus (e.g., the electronic apparatus 1, the PC 3, or the mobile device 4) that shares photographing setting values with other electronic apparatuses, according to an embodiment.

Referring to FIG. 16, in operation 1600, the electronic apparatus receives an image list, including a plurality of images (the images including photographing setting values), from an external device connected thereto via a network.

In operation 1602, the electronic apparatus displays the image list. As illustrated in FIG. 6, the photographing apparatus receives the image list by communicating with the external device. Different image lists may be provided based on a ranking, a creation order, and a category.

In operation 1604, the electronic apparatus selects an image from the image list. When the image is selected, the selected image may be downloaded from the external device, and the photographing setting values of the downloaded selected image may be set in the electronic apparatus.

If it is determined in operation 1606 that a photographing signal is input, the electronic apparatus photographs a subject (e.g., captures an image) based on the photographing setting values included in the selected image, in operation 1608. In operation 1608, the electronic apparatus may display the features included in the selected image and automatically photograph the subject by using the photographing setting values included in the selected image based on a photographing mode switch signal or the photographing signal.

In operation 1610, the electronic apparatus records and stores the captured image.

Figure 17:
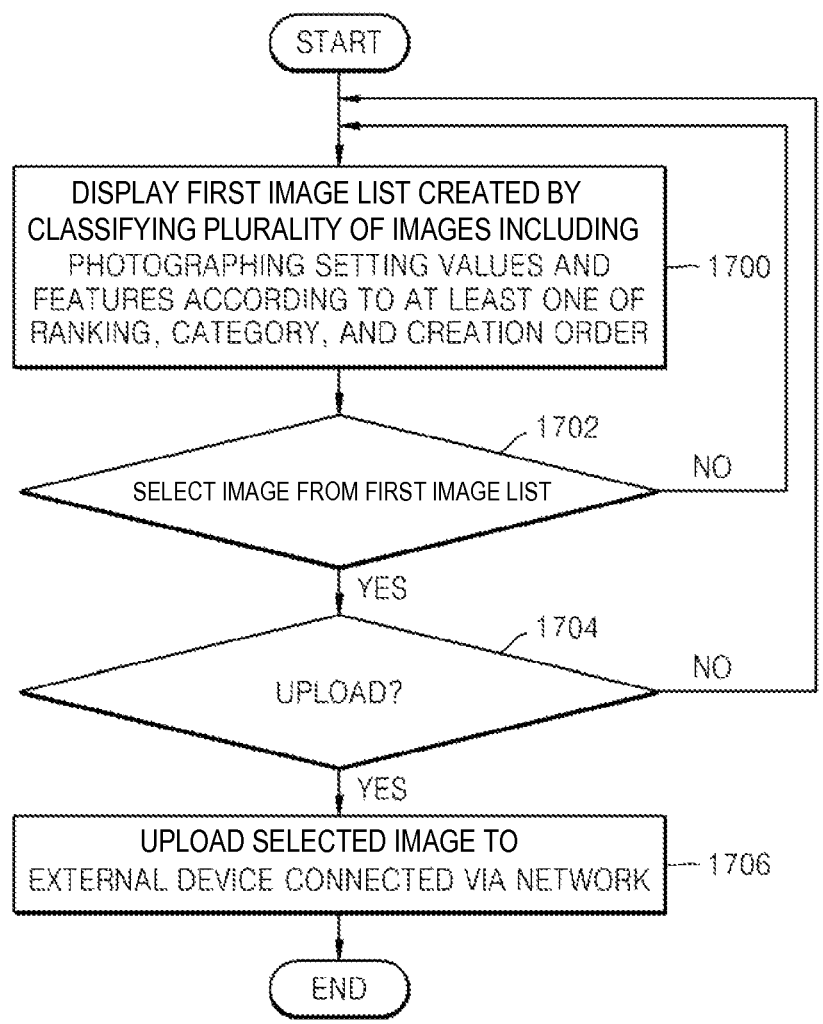
FIG. 17 is a flowchart of a controlling method performed in an electronic apparatus that shares photographing setting values with other electronic apparatuses, according to another embodiment.

FIG. 17 is a flowchart of a controlling method performed in an electronic apparatus (e.g., the electronic apparatus 1, the PC 3, or the mobile device 4) that shares photographing setting values with other electronic apparatuses, according to another embodiment.

Referring to FIG. 17, in operation 1700, the electronic apparatus displays a first image list created by classifying a plurality of images including photographing setting values and features based on at least one of a ranking, a category, and a creation order.

In operation 1702, the electronic apparatus selects an image from the first image list. If it is determined in operation 1704 that an upload request signal is input, the electronic apparatus uploads the selected image to an external device connected thereto via a network, in operation 1706.

As described above, according to the one or more of the above embodiments, an electronic apparatus may easily and quickly share images together with other electronic apparatuses via a sharing system.

Even when a user does not know electronic apparatuses of other users, the sharing system may serve as a manager and may easily and quickly share photographing setting values that are set in other electronic apparatuses.

Even when other new electronic apparatuses are developed over time, a sharing system may transform existing images based on the newly developed electronic apparatuses so that the existing images may be re-used by the new electronic apparatuses.

Although electronic apparatuses belong to different product groups, they may commonly use images and may easily and quickly share an image list in a descending order of ranking by applying the number of downloads or suggestions.

All references, including publications, patent applications, and patents, cited herein are hereby incorporated by reference to the same extent as if each reference were individually and specifically indicated to be incorporated by reference and were set forth in its entirety herein.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

What is claimed is:

1. A method performed in an electronic apparatus that shares photographing setting values, the method comprising:
   receiving an image list, including a plurality of images including the photographing setting values, from an external device connected to the electronic apparatus via a network;
   displaying the image list, wherein the displayed image list comprises a respective thumbnail image corresponding to only the images having an image type that matches a type of the electronic apparatus; and
   capturing an image of a subject based on photographing setting values included in an image selected from the image list,
   wherein an image that does not match with the type of the electronic apparatus from the plurality of images included in the image list is processed to be displayed opaquely.

2. The method of claim 1, wherein the image list is created based on one or more images that are created by a plurality of other electronic apparatuses connected to the external device via the network and transmitted to the external device.

3. The method of claim 2, further comprising classifying the plurality of images included in the image list based on the types of the plurality of other electronic apparatuses.

4. The method of claim 1, wherein the displaying of the image list comprises displaying images from the image list that are classified based on at least one of a ranking, a category, or a creation order.

5. The method of claim 1, wherein, while a previous image to which the photographing setting values included in the selected image are not applied and a next image to which the photographing setting values included in the selected image have been applied are being displayed, at least one of a download selection button, a preference selection button, or preference of the selected image is displayed.

6. The method of claim 5, further comprising downloading the selected image based on a selection signal corresponding to the download selection button.

7. The method of claim 1, further comprising:
   displaying a live view image including the subject;
   identifying the subject and suggesting a plurality of images corresponding to the identified subject in a ranking order; and
   capturing the image of the subject based on photographing setting values included in an image selected from the suggested plurality of images.

8. The method of claim 1, wherein the displaying of the image list comprises displaying whether the photographing setting values are applied depending on a type of the electronic apparatus.

9. The method of claim 1, further comprising changing the photographing setting values included in the selected image to photographing setting values supported by the electronic apparatus when the photographing setting values included in the selected image are within a range of photographing setting values not supported by the electronic apparatus.

10. A non-transitory computer-readable recording medium having recorded thereon a program for executing the method of claim 1.

11. An electronic apparatus that shares photographing setting values, the electronic apparatus comprising:
a communication unit that communicates with an external device connected to the electronic apparatus via a network;
an image list receiving unit that receives an image list, including a plurality of images including the photographing setting values, from the external device; and
a control unit that displays the image list and captures an image of a subject based on photographing setting values included in an image selected from the image list, wherein the control unit only displays a respective thumbnail image corresponding to the images having an image type that matches a type of the electronic apparatus,
wherein the control unit processes an image that does not match with the type of the electronic apparatus from the plurality of images included in the image list so to be displayed opaquely.

12. The electronic apparatus of claim 11, wherein the image list is created based on one or more images that are created by a plurality of other electronic apparatuses connected to the external device via the network and transmitted to the external device.

13. The electronic apparatus of claim 12, further comprising an image classification unit that classifies the plurality of images included in the image list based on the types of the plurality of other electronic apparatuses.

14. The electronic apparatus of claim 11, wherein the control unit displays images from the image list that are classified based on at least one of a ranking, a category, or a creation order.

15. The electronic apparatus of claim 11, wherein the control unit displays at least one of a download selection menu, a preference selection menu, or a preference selection number of the selected image while displaying a previous image to which the photographing setting values included in the selected image are not applied and a next image to which the photographing setting values included in the selected image have been applied.

16. The electronic apparatus of claim 15, further comprising an image download unit that downloads the selected image based on a selection signal corresponding to the download selection menu.

17. The electronic apparatus of claim 11, wherein the control unit displays a live view image including the subject, identifies the subject, suggests a plurality of images corresponding to the identified subject in a ranking order, and captures the image of the subject based on photographing setting values included in the image selected from the suggested plurality of images.

18. The electronic apparatus of claim 11, wherein the control unit displays whether the photographing setting values are applied depending on the type of the electronic apparatus.

19. The electronic apparatus of claim 11, further comprising an image transformation unit that changes the photographing setting values included in the selected image to photographing setting values supported by the electronic apparatus when the photographing setting values included in the selected image are within a range of photographing setting values not supported by the electronic apparatus.

* * * * *